(12) United States Patent
Solum

(10) Patent No.: US 10,422,907 B2
(45) Date of Patent: Sep. 24, 2019

(54) SEISMIC LINEATION MAPPING METHOD AND SYSTEM

(71) Applicant: SHELL OIL COMPANY, Houston, TX (US)

(72) Inventor: John Solum, Rijswijk (NL)

(73) Assignee: SHELL OIL COMPANY, Houston, TX (US)

(*) Notice: Subject to any disclaimer, the term of this patent is extended or adjusted under 35 U.S.C. 154(b) by 43 days.

(21) Appl. No.: 15/515,827

(22) PCT Filed: Oct. 1, 2015

(86) PCT No.: PCT/EP2015/072758
§ 371 (c)(1),
(2) Date: Mar. 30, 2017

(87) PCT Pub. No.: WO2016/050942
PCT Pub. Date: Apr. 7, 2016

(65) Prior Publication Data
US 2017/0307774 A1 Oct. 26, 2017

Related U.S. Application Data

(60) Provisional application No. 62/166,812, filed on May 27, 2015.

(30) Foreign Application Priority Data

Oct. 3, 2014 (EP) .................................. 14187644

(51) Int. Cl.
*G01V 1/36* (2006.01)
*G02B 27/46* (2006.01)
(Continued)

(52) U.S. Cl.
CPC .............. *G01V 1/364* (2013.01); *G01V 1/302* (2013.01); *G01V 1/345* (2013.01); *G02B 27/46* (2013.01);
(Continued)

(58) Field of Classification Search
CPC ........ G01V 1/364; G01V 1/345; G01V 1/302; G01V 1/36; G01V 2210/00; G01V 2210/64; G01V 2210/74; G06E 3/001; G02B 27/46
See application file for complete search history.

(56) References Cited

U.S. PATENT DOCUMENTS

| 4,228,529 A | 10/1980 | Hsu et al. | |
| 2008/0165186 A1* | 7/2008 | Lin | G06T 15/08 345/419 |

(Continued)

FOREIGN PATENT DOCUMENTS

| EP | 1696247 | 8/2006 |
| GB | 2503507 | 1/2014 |

OTHER PUBLICATIONS

Schetselaar, "3-D Symbolization of Planar and Linear Fabric Elements using surfboards as an Aid to the Analysis of Geological Structures", 2001. (Year: 2001).*

(Continued)

*Primary Examiner* — Regis J Betsch
*Assistant Examiner* — Jeremy A Delozier

(57) ABSTRACT

A method for seismic geological lineation mapping, wherein a seismic dataset is collected, with information about minor lineations generated by subtle structural geological features in an underground earth formation. Seismic attribute volumes are identified in the seismic dataset, relating to trace continuity, amplitude, frequency and phase. The attribute volumes may have an insufficient resolution to display the (Continued)

minor lineations. A seismic multivolume lithological lineation map is generated, in which single attribute lineation maps generated for each of the identified seismic attribute volumes are combined to accurately display the minor lineations generated by the subtle geological features.

6 Claims, 6 Drawing Sheets

(51) Int. Cl.
 G06E 3/00 (2006.01)
 G01V 1/30 (2006.01)
 G01V 1/34 (2006.01)
(52) U.S. Cl.
 CPC .............. *G06E 3/001* (2013.01); *G01V 1/36* (2013.01); *G01V 2210/00* (2013.01); *G01V 2210/64* (2013.01); *G01V 2210/74* (2013.01)

(56) References Cited

U.S. PATENT DOCUMENTS

| 2008/0212841 | A1* | 9/2008 | Gauthier | G01V 1/32 |
| | | | | 382/109 |
| 2010/0225642 | A1* | 9/2010 | Murray | G06T 17/05 |
| | | | | 345/419 |
| 2010/0312529 | A1* | 12/2010 | Souche | E21B 43/26 |
| | | | | 703/2 |

OTHER PUBLICATIONS

Chahine et al., "Enhanced delineation of reservoir compartmentalization from advanced pre and post-stack seismic attribute analysis", First Break, European Association of Geoscientists and Engineers, vol. 32, Mar. 1, 2014, pp. 75-84, XP002737999.

Halpert et al., "Seismic image segmentation with multiple attributes", 79th Society of Exploration Geophysicists International Exposition and Annual Meeting 2009: (SEG Houston 2009), Oct. 25, 2009, pp. 3700-3704, XP002738000.

Betzler et al., "Giant pockmarks in a carbonate platform (Maldives, Indian Ocean)", Marine Geology, Nov. 2011, vol. 289, pp. 1-16.

Dou et al., "Paleokarst system development in the San Andres Formation", Permian Basin, revealed by seismic characterization, Journal of Applied Geophysics, 2011, vol. 75, pp. 379-389.

Colpaert et al., "3D seismi analysis of an Upper Palaeozoic carbonate succession of the Eastern Finnmark Platform area", Norwegian Barents Sea, Sedimentary Geology, Apr. 2007, vol. 197, pp. 79-98.

Hong et al., "Seismic attribute mapping in carbonate depositional environment, some lessons from case studies", AAPG Search and Discovery Article 41159, May 19-22, 2013, presented at AAPG 2013 Annual Convention, Pittsburgh, Pennsylvania.

Lifeng et al., "Seismic attributes and integrated prediction of fractured and caved carbonate reservoirs in the Tarim Basin", China, Petroleum Science, Dec. 2011, vol. 8(4), pp. 455-461.

Staples et al., "Fracture analysis using 3D seismic attributes in the Hunton Limestone", Oklahoma, USA, presentation at the SEG Denver 2010 Annual Meeting, Oct. 17-22, 2010.

Samuelsberg et al., "Late Palaeozoic evolution of the Finnmark Platform, southern Norwegian Barents Sea", Norwegian Journal of Geology, Oct. 2003, vol. 83(4), pp. 351-362.

Sun et al., "3D seismic interpretation of dissolution pipes in the South China Sea: Genesis by subsurfaces, fluid induced collapse", Marine Geology, Mar. 2013, vol. 337, pp. 171-181.

Vetrici et al., "3-D seismic attributes", Crewes Research Report, 1996, vol. 8.

International Search Report and Written Opinion received for PCT Patent Application No. PCT/EP2015/072758, dated Feb. 3, 2016, 9 pages.

* cited by examiner

SEISMIC LINEATION MAPPING METHOD AND SYSTEM

CROSS REFERENCE TO EARLIER APPLICATIONS

This application is a US national stage application of PCT/EP2015/072758, filed 1 Oct. 2015, which claims priority benefits of European application No. 14187644.1, filed 3 Oct. 2014, and of U.S. Provisional Application No. 62/166,812, filed 27 May 2015.

FIELD OF THE INVENTION

The invention relates to a method and system for seismic lineation mapping.

BACKGROUND OF THE INVENTION

Seismic surveys utilize acoustic reflections from stratigraphic interfaces, fractures, and other anomalies to generate seismic maps that display subsurface stratigraphic interfaces, known as horizons, fractures, lineations and other anomalies.

In structural geology lithological lineations are identified as linear structural features within rocks, which may include a fault, a fracture corridor, a change in the rock lithology, or some other geological discontinuity. There are several types of lithological lineations, such as intersection lineations, crenulation lineations, mineral lineations and stretching lineations being the most common.

Intersection lineations may be formed be due to the intersection of two foliations and stretching lineations may be formed by shearing of rocks during asymmetric deformation of a rock mass.

Intersecting and stretching lineations may be measured on a single outcrop, and may typically have lengths of several millimeters to several meters.

Lineations mapped on seismic volumes, on the other hand, may typically be measured on several outcrops and may have lengths of several hundred to several thousand meters.

U.S. Pat. No. 4,228,529 discloses a method for enhancing display of natural lithological lineations in a seismic map by applying shading patterns to zones between contour segments. This known lineation display enhancement method may still have an insufficient resolution to display minor lineations generated by subtle structural geological features.

There is a need for an improved method for displaying lithological and structural lineations with an enhanced resolution such that also minor lineations generated by subtle structural geological features are accurately displayed in a seismic map.

SUMMARY OF THE INVENTION

In accordance with the invention there is provided a method for seismic lineation mapping comprising:
collecting from a seismic survey a seismic dataset with information about minor lineations generated by subtle structural geological features in an underground earth formation;
identifying in the seismic dataset seismic attribute volumes relating to trace continuity, amplitude, frequency and phase, which attribute volumes may each by themselves have an insufficient resolution to display the minor lineations generated by the subtle structural geological features; and
generating a seismic multivolume lineation map in which the lineations interpreted on the identified seismic attribute volumes are combined to enhance display of the minor lineations generated by the subtle geological features.

In accordance with the invention there is furthermore provided a system for seismic lineation mapping, comprising a computer readable medium, which, when connected to a computer, induces the computer to execute the method according to the invention.

These and other features, embodiments and advantages of the method and/or system according to the invention are described in the accompanying claims, abstract and the following detailed description of non-limiting embodiments depicted in the accompanying drawings, in which description reference is made to features and objects depicted in the drawings.

Figure 1:
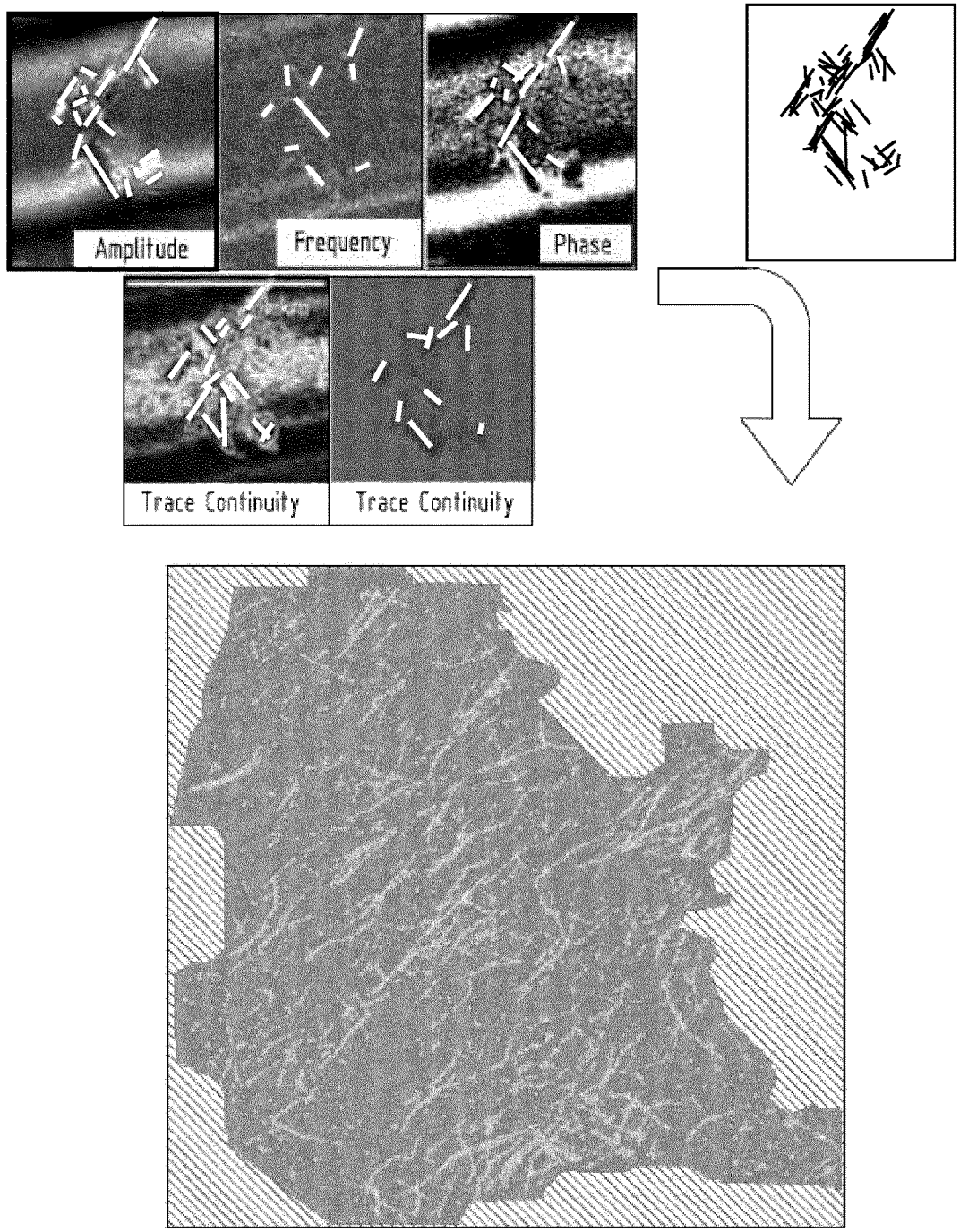
FIG. 1 shows how minor lineations generated by subtle structural features as mapped in a seismic multivolume lineation map where the lineations mapped from different seismic attribute volumes are combined.

Similar features depicted reference numerals in different figures denote the same or similar objects or features. Objects and features depicted in the figures and/or described in this specification, abstract and/or claims may be combined in different ways by a person skilled in the art.

DETAILED DESCRIPTION OF THE DEPICTED EMBODIMENTS

A method for seismic geological lineation mapping is proposed, wherein a seismic dataset is collected, with information about minor lineations generated by subtle structural geological features in an underground earth formation. Seismic attribute volumes are identified in the seismic dataset, relating to trace continuity, amplitude, frequency and phase. The attribute volumes may have an insufficient resolution to each individually display the minor lineations. However, single attribute lineation maps can be generated from each seismic attribute volume wherein the identified lineations can be mapped. A seismic multivolume lithological lineation map is generated, in which the single attribute lineation maps generated from each of the identified seismic attribute volumes are combined to accurately display the minor lineations generated by the subtle geological features.

Suitably, the seismic multivolume lineation map is subsequently calibrated against actual well production, well drilling reports or cores, to create a map of geological reservoir properties.

There is a need to accurately map minor lineations generated by subtle structural features since:
I) Minor lineations generated by subtle structures can strongly influence reservoir and oil and/or gas production well performance;
II) The density and azimuthal variance of minor lineations generated by subtle structures can be used as proxies for increased or decreased reservoir and oil and/or gas production well production performance.
III) The distribution of reservoir properties (dolomitization, leaching, karsting) can be controlled by the distribution of minor lineations generated by subtle structures; and
IV) Minor lineations generated by subtle structures can also provide drilling hazards.

Despite their importance, interpretation of minor lineations generated by subtle structural features is difficult due to their ambiguous seismic expression.

Interpretations based on any single attribute will be ambiguous since each single attribute volume may have an insufficient resolution to display the minor lineations generated by the subtle structural geological features.

The underground formation may comprise rock layers that are stacked between horizons and the method may further comprise mapping the minor lineations on seismic horizons of interest on each of the identified attribute volumes.

The underground formation may furthermore comprise a network of fractures or alteration that generate the subtle geological features and the method further may furthermore comprise:
displaying the minor lineations in the seismic multivolume lineation map in which the lineation maps based on the identified seismic attribute volumes are combined;
dividing the formation into a series of adjacent grid cells;
gridding the displayed lineations within the grid cells;
measuring a total length of the displayed lineations within at least one selected grid cell;
measuring a total combined lineation length in the fractured earth formation;
weighting the measured total length of the displayed lineations within the at least one selected grid cell by the measured total lineation length in the fractured rock formation to generate a proxy for fracture intensity and/or intensity of reservoir alteration in the at least one grid cell; and
measuring an angular variance of the displayed lineations within a grid cell to generate a proxy for the connectivity of fracture networks in the at least one grid cell.

In such case the method may further comprise combining the proxies for fracture intensity and/or fracture connectivity with existing well data, which data include initial well production rates and/or ultimate well recoveries to allow sweet-spotting of production from areas of the fractured formation with a high fracture or alteration intensity and/or fracture connectivity. The proxies for fracture intensity and/or intensity of reservoir alteration may thus be calibrated against actual well and/or core data in the at least one grid cell. Likewise, the proxy for the connectivity of fracture networks may be calibrated against actual well and/or core data in the at least one grid cell.

The method described herein may be used to manage and/or enhance production of crude oil and/or gas from the underground formation which comprises the minor lineations generated by subtle structural geological features and crude oil and/or gas stored in pores spaces between particles of the formation.

Figure 3:
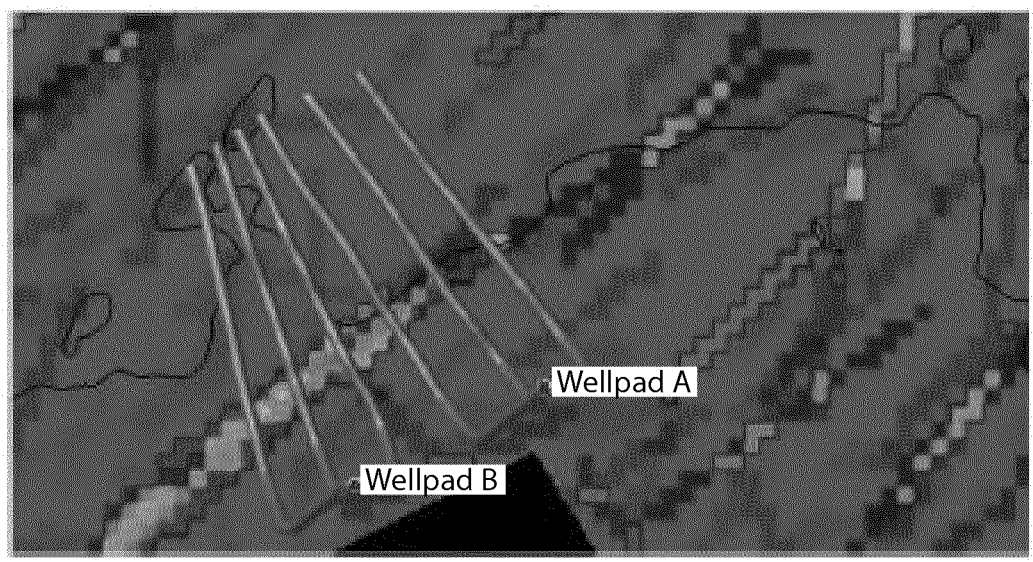
FIG. 3 shows how the multivolume attribute interpretation shows minor lineations that were unclear in FIG. 2.

FIGS. 1 and 3 illustrate that a seismic multivolume lineation map, in which the mapped lineations are combined, is able to accurately map minor lineations generated by subtle structural features.

Seismic interpretations based on multiple volumes as proposed herein are more reliable since they make it easier for a seismic interpreter to:
I) create a more reliable seismic interpretation by combining multiple attribute volumes;
II) conduct structural due diligence; and
III) determine how multivolume interpretations can be related to well behavior.

There may be more than 50 seismic attribute volumes that may be displayed in a seismic map. There is a need to permit a seismic interpreter to quickly determine which are best in a given setting.

The selected seismic dataset seismic attribute volumes may comprise at least four volumes relating to 1) trace continuity, 2) amplitude, 3) frequency and 4) phase, which four attribute volumes may each have an insufficient resolution to adequately display the minor lineations generated by the subtle structural geological features.

FIG. 1 shows a multivolume lineation map in which single attribute lineation maps based on seismic attribute volumes are combined to enhance minor lineations. The upper part of FIG. 1 illustrates that single attribute volumes comprising minor lineations generated by subtle structural geological features where solely one of the four attributes (a) amplitude, (b) frequency, (c) phase (d) and (e) trace continuity are shown are unclear due to a low seismic resolution of each of the four attributes.

The lower part of FIG. 1 illustrates how the single attribute lineation maps based on the four attribute volumes, i.e. amplitude, frequency, phase, and trace continuity, may be combined to generate a seismic multivolume lineation map in which the mapped minor lineations (~15,000 in the example shown) generated by the subtle geological features are enhanced and clearly displayed.

Schematic examples of single attribute lineation maps are shown in the upper portion of FIG. 1. These lineation maps have been generated by identifying the minor lineations on the selected horizon of interest in each of the identified seismic attribute volumes, and then creating an image layer (represented by white line pieces) for each of the identified seismic attribute volumes whereby the image layer consists of lineation traces that trace the identified minor lineations in the identified seismic attribute volume. The image layer shown in the top-right hand corner corresponds to all lineations mapped on each of the single attribute lineation maps that will be combined to generate a multivolume lineation map.

A seismic interpreter may therefore generate a seismic multivolume lineation map where these four, and optionally selected additional others, single attribute lineation maps from the individual seismic attribute volumes are combined to enhance display of the minor lineations generated by the subtle geological features.

Figure 2:
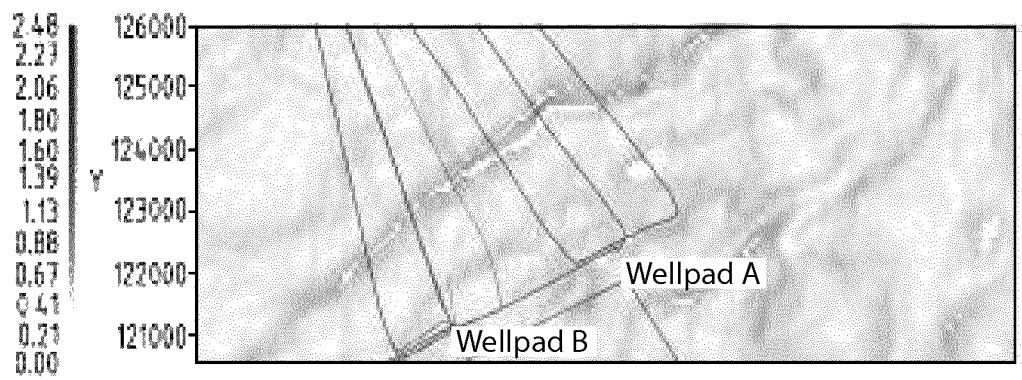
FIG. 2 shows an ambiguous conventional seismic map due to single volume seismic attribute interpretation.

FIG. 2 shows a conventional seismic map with ambiguous minor lineations due to single volume seismic attribute interpretation. FIG. 2 shows that a conventional single volume seismic attribute interpretation, based on trace continuity in this example, in a conventional seismic map of a reservoir formation does not clearly show minor lineations generated by subtle geological features. The formation shown in FIG. 2 is traversed by two multibranched wells that each comprises three horizontal inflow regions.

FIG. 3 shows a multivolume attribute interpretation. FIG. 3 shows how the multivolume attribute interpretation of the same formation and multibranched wells shown in FIG. 2 clearly shows minor lineations generated by subtle geological features, which lineations were unclear in FIG. 2. Minor lineations that were unclear in FIG. 2 are clearly visible in FIG. 3.

Figure 4:
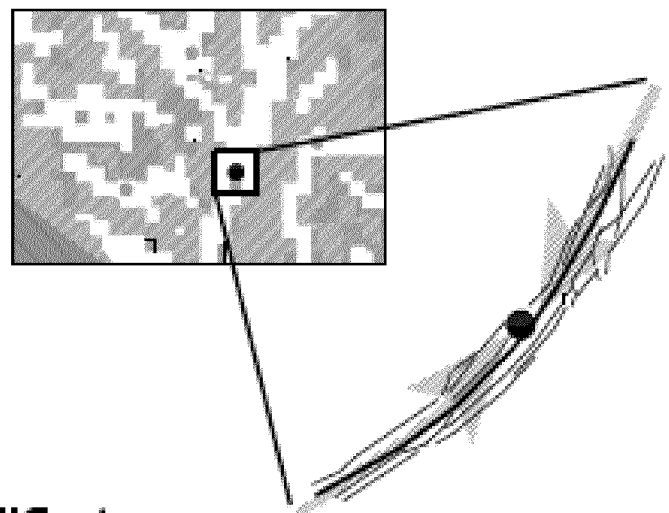
FIG. 4 shows how lineation density weighted by lineation length highlights subtle features and is a proxy for fracturing/diagenesis intensity.

FIG. 4 shows how lineation density weighted by lineation length highlights the presence of subtle features in the reservoir formation and is a proxy for fracturing/alteration intensity and/or fracturing/diagenesis intensity in the reservoir formation near the mapped minor lineations. The fracturing/alteration intensity and/or fracturing/diagenesis intensity may also be observed independently in wells or cores, and a comparison between the proxies and actual observations may be employed to calibrate the seismic multivolume lineation map as generated in the present disclosure. A high fracturing/alteration intensity is a proxy for an increased crude oil and/or natural gas production capacity of the reservoir formation and the associated oil and/or natural gas production wells in reservoirs where production is from subtle geological structures. FIG. 4 thus illustrates how lineation density weighted by lineation length highlights subtle features, and cab be converted to a proxy for fracturing/alteration intensity associated with those features. The conversion may involve calibrating against actual well and/or core data. Herewith a part of a geological model of the subsurface may be provided.

Figure 5:
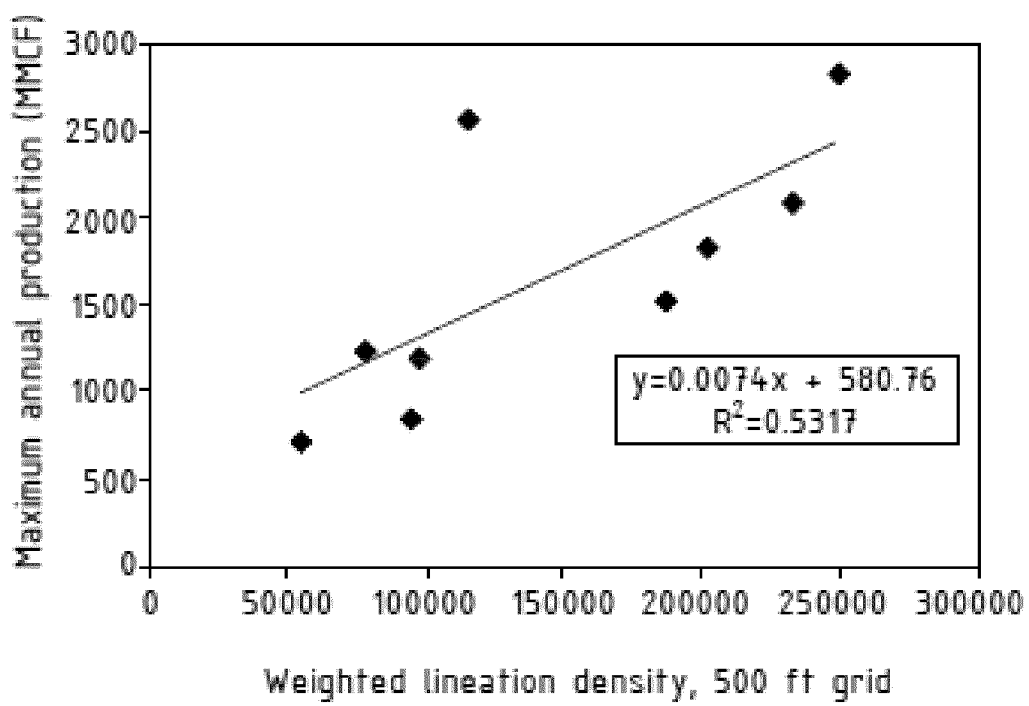
FIG. 5 is a graph indicating that annual production increases with increased lineation density along wellbore.

Annual production increases with increased lineation density along wellbore if all other reservoir properties are held constant. FIG. 5 is a graph based on the multivolume lineation mapping method according to an embodiment which indicates that annual production increases with increased lineation density along the wellbore of an oil and/or gas production well traversing a reservoir formation with a high lineation density as illustrated in FIG. 4, if all other reservoir properties are held constant.

Figure 6:
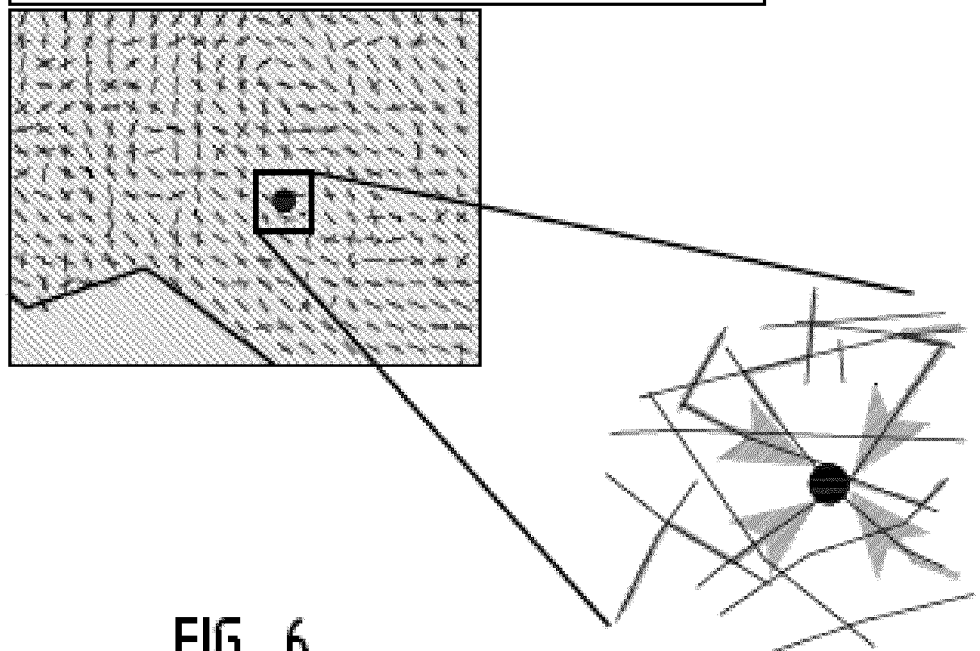
FIG. 6 shows that the azimuthal variance of lineations is a proxy for fracture connectivity.

FIG. 6 illustrates that azimuthal variance of lineations is a proxy for fracture connectivity for fractures associated with mapped minor lineations. Specifically, a high azimuthal variance of lineations in an oil and/or gas containing reservoir formation is a proxy for a high connectivity of fractures associated with the mapped minor lineations.

Maximum annual production decreases with increased angular variance if all other reservoir properties are held constant.

Figure 7:
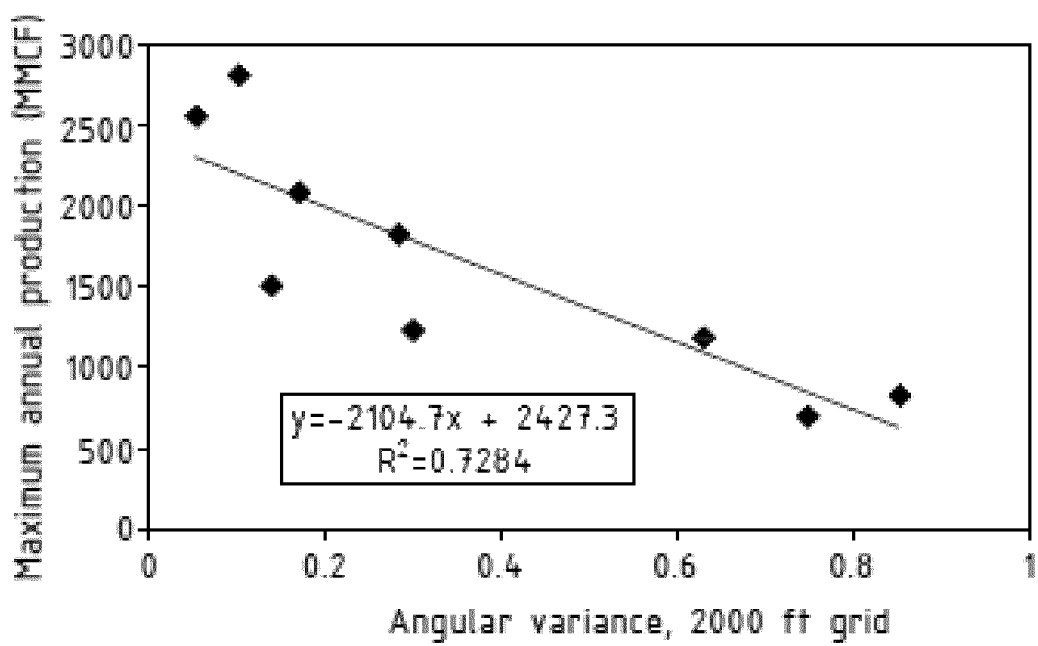
FIG. 7 is a graph indicating that maximum annual production decreases with increased angular variance.

FIG. 7 is a graph based on the multivolume lineation mapping method described herein which indicates that a maximum annual oil and/or natural gas production from the oil and gas containing reservoir formation decreases with increased angular variance if all other reservoir properties are held constant. It shows an example of how a seismic multivolume lineation map may be calibrated to actual well behavior. It is another example of how calibration against actual well/and or core data can be achieved. Herewith a part of a geological model of the subsurface can be provided.

Figure 8:
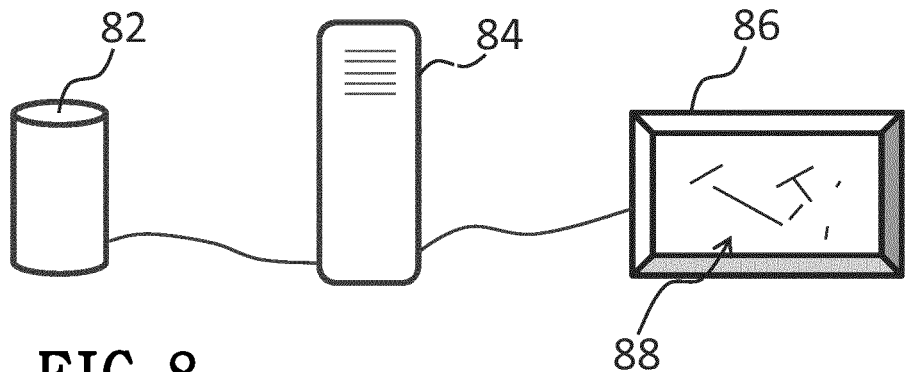
FIG. 8 schematically illustrates a system for seismic lineation mapping.

FIG. 8 shows a system for seismic lineation mapping, comprising a computer readable medium 82 that is connectable to a computer 84. When connected to a computer 84, the computer readable medium 82 is capable of inducing the computer to execute one or more embodiments of the method for seismic geological lineation mapping described herein.

The system may furthermore comprise a computer 82 and a Graphical User Interface 86 (GUI), which are configured to:

collect from a seismic survey a seismic dataset with information about minor lineations generated by subtle structural geological features in an underground earth formation;

identify in the seismic dataset seismic attribute volumes relating to trace continuity, amplitude, frequency and phase, which attribute volumes may have an insufficient resolution to display the minor lineations generated by the subtle structural geological features; and display at the GUI a seismic multivolume lineation map 88 in which single attribute lineation maps based on the identified seismic attribute volumes are combined to enhance display of the minor lineations generated by the subtle geological features.

The computer 84 and GUI 86 may furthermore be configured to:

divide the formation into a series of adjacent grid cells;
grid the displayed lineations within the grid cells;
measure a total length of the displayed lineations within at least one selected grid cell;
measure a total combined lineation length in the fractured earth formation;
weight the measured total length of the displayed lineations within the at least one selected grid cell by the measured total lineation length in the fractured rock formation to generate a proxy for fracture intensity and/or intensity of reservoir alteration in the at least one grid cell; and
measure an angular variance of the displayed lineations with a grid cell to generate a proxy for the connectivity of fracture networks in the at least one grid cell.

Figure 9:
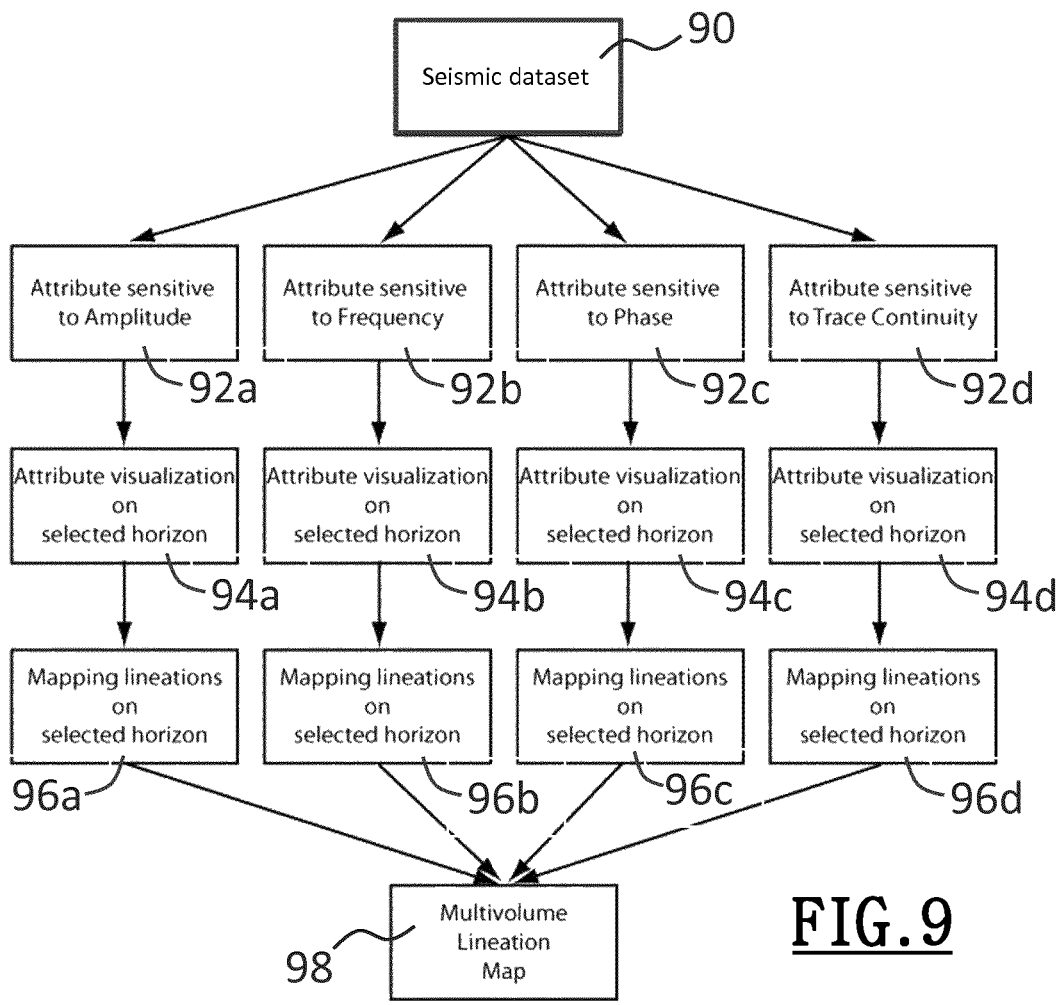
FIG. 9 shows a schematic block diagram of a method for seismic lineation mapping.

FIG. 9 shows a schematic block diagram of a method for seismic lineation mapping. It shows a seismic dataset 90 obtained from a seismic survey. Seismic attribute volumes 92a-d are identified, relating to amplitude (92a), frequency (92b), phase (92c), and trace continuity (92d). A horizon of interest is selected in each of these seismic attribute volumes and the attribute is visualized on the selected horizon in each of these seismic attribute volumes (94a-d). Then single attribute lineation maps are generated based on the visualizations on the selected horizon in each of these attribute volumes (96a-d). This step may comprise identifying the minor lineations on the selected horizon of interest in each of the visualizations, and creating an image layer for each of the identified visualizations thereby identifying the minor lineations on the selected horizon of interest in each of the identified seismic attribute volumes, creating an image layer for each of the identified seismic attribute volumes whereby the image layer consists of lineation traces that trace the identified minor lineations in the identified seismic attribute volume, wherein each image layer corresponds to one of the single attribute lineation maps. Then, a seismic multivolume lineation map 98 is generated in which the single attribute lineation maps from steps 96a-d are combined.

Figure 10:
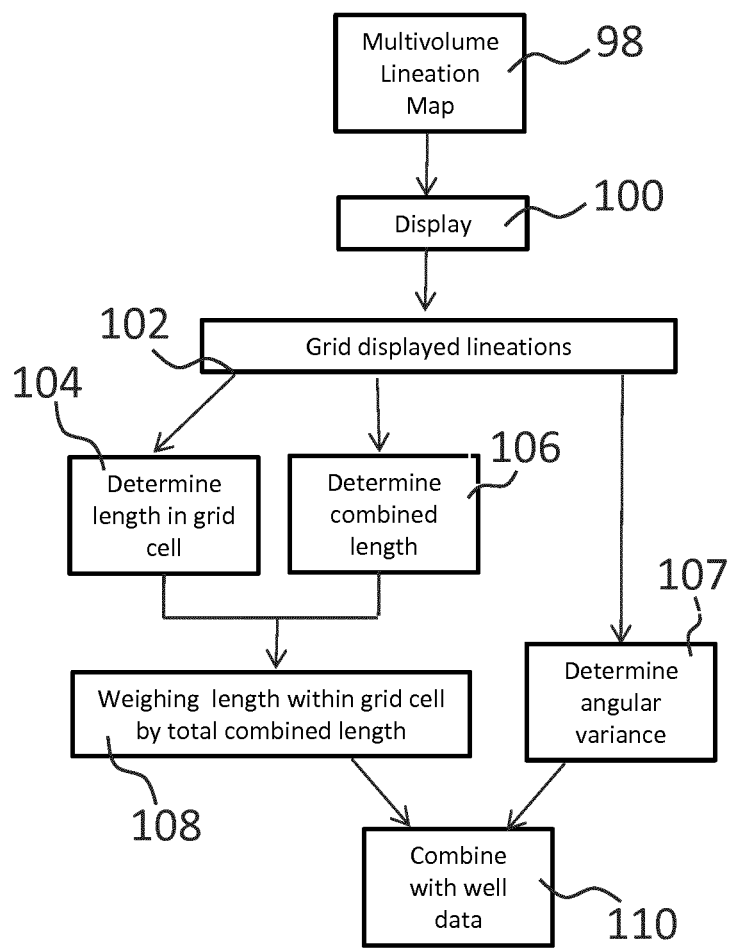
FIG. 10 shows a schematic block diagram of how the seismic volume lineation map can be further processed.

FIG. 10 schematically shows how the seismic volume lineation map 98 can be further processed into a geological model, by converting the seismic multivolume lineation map into geological proxies by calibration against actual well data and/or core data. It starts with obtaining a multivolume lineation map 98 in which the single attribute lineation maps generated for the identified seismic attribute volumes have been combined, and displaying (100) the minor lineations in the seismic multivolume lineation map. The displayed lineations are then gridded (102) within grid cells into which the formation has been divided. The optimum grid size and/or orientation may be found by empirical studies. A total length of the displayed lineations is then measured (104) within at least one selected grid cell for all of the grid cells and a total combined lineation length is measured (106) of the lineations that are confined within a single grid cell or that span across multiple grid cells. The measured total length of the displayed lineations within the at least one selected grid cell is then weighted (108) by the measured total lineation length in the fractured earth formation, to generate a proxy for fracture intensity and/or intensity of reservoir alteration in the at least one grid cell.

It is also possible to measure (105) an angular variance of the displayed lineations with a grid cell to generate a proxy for the connectivity of fracture networks in the at least one grid cell.

The proxies for fracture intensity and/or fracture connectivity may be combined (110) with existing well data. A part of a geological model of the subsurface may be created by converting the seismic multivolume lineation maps to representations of well and/or reservoir properties. Such conversion may be calibrated against actual well and/or core data. Optimum grid size and/or orientation may be found empirically by repeating the weighting of lengths and/or determining angular variance and combining with existing well data. This way the grid size and/or orientation can be found which delivers proxies that provide the best correlation with the existing well data. In some cases the empirically determined optimum grid that yields the best matching fracture intensity proxies may differ from the optimum grid that yields the best matching proxy for connectivity.

The method and system described herein are well adapted to attain the ends and advantages mentioned as well as those that are inherent therein.

The particular embodiments disclosed above are illustrative only, as the present embodiments may be modified and practiced in different but equivalent manners apparent to those skilled in the art having the benefit of the teachings herein. Furthermore, no limitations are intended to the details of construction or design herein shown, other than as described in the claims below.

It is therefore evident that the particular illustrative embodiments disclosed above may be altered or modified and all such variations are considered within the scope and spirit of the present invention.

While the proposed system and method may be described in terms of "comprising," "containing," or "including" various components or steps, they can also "consist essentially of" or "consist of" the various components and steps.

Furthermore, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

If there is any conflict in the usages of a word or term in this specification and one or more patent or other documents that may be cited herein by reference, the definitions that are consistent with this specification should be adopted.

The invention claimed is:

1. A method for seismic lineation mapping comprising:
    collecting from a seismic survey a seismic dataset with information about lithological and structural lineations including minor lineations generated by subtle structural geological features in an underground earth formation comprising rock layers that are stacked between horizons and a network of fractures that generate the subtle geological features;
    identifying in the seismic dataset seismic attribute volumes relating to trace continuity, amplitude, frequency and phase, which attribute volumes may each by themselves have an insufficient resolution to display the minor lineations generated by the subtle structural geological features;
    selecting a horizon of interest from said horizons;
    generating single attribute lineation maps representing lineations including the minor lineations on the horizon of interest in each of the identified seismic attribute volumes; and
    generating a seismic multivolume lineation map in which the single attribute lineation maps generated for each of the identified seismic attribute volumes are combined, to enhance display of the minor lineations generated by the subtle geological features;
    displaying the minor lineations in the seismic multivolume lineation map in which the single attribute lineation maps generated for the identified seismic attribute volumes have been combined;
    dividing the formation into a series of adjacent grid cells;
    gridding the displayed lineations within the grid cells;
    measuring a total length of the displayed lineations within at least one selected grid cell;
    measuring a total combined lineation length in the fractured rock formation;
    weighting the measured total length of the displayed lineations within the at least one selected grid cell by the measured total lineation length in the fractured earth formation to generate a proxy for fracture intensity and/or intensity of reservoir alteration in the at least one grid cell; and
    measuring an angular variance of the displayed lineations with a grid cell to generate a proxy for the connectivity of fracture networks in the at least one grid cell; and
    displaying the seismic multivolume lineation map at a graphical user interface (GUI), whereby the display of the minor lineations generated by the subtle geological features is enhanced.

2. The method of claim 1, wherein generating the single attribute lineation maps comprises identifying the minor lineations on the selected horizon of interest in each of the identified seismic attribute volumes, creating an image layer for each of the identified seismic attribute volumes whereby the image layer consists of lineation traces that trace the identified minor lineations in the identified seismic attribute volume, wherein each image layer corresponds to one of the single attribute lineation maps.

3. The method of claim 1, wherein the method further comprises combining the proxies for fracture intensity and/or fracture connectivity with existing well data, which data include initial well production rates and/or ultimate well recoveries to allow sweet-spotting of production from areas of the fractured formation with a high fracture intensity/alteration and/or fracture connectivity.

4. The method of claim 1, wherein the method is used to manage and/or enhance production of crude oil and/or gas from the underground formation which comprises the minor lineations generated by subtle structural geological features and crude oil and/or gas stored in pores spaces between particles of the formation.

5. A system for seismic lineation mapping comprising a computer, a graphical user interface (GUI), and a computer readable medium, which, when connected to the computer, induces the computer to execute a method for seismic lineation mapping wherein:

collecting from a seismic survey a seismic dataset with information about lithological and structural lineations including minor lineations generated by subtle structural geological features in an underground earth formation comprising rock layers that are stacked between horizons;

identifying in the seismic dataset seismic attribute volumes relating to trace continuity, amplitude, frequency and phase, which attribute volumes may each by themselves have an insufficient resolution to display the minor lineations generated by the subtle structural geological features;

selecting a horizon of interest from said horizons;

generating single attribute lineation maps representing lineations including the minor lineations on the horizon of interest in each of the identified seismic attribute volumes; and generating a seismic multivolume lineation map in which the single attribute lineation maps generated for each of the identified seismic attribute volumes are combined, to enhance display of the minor lineations generated by the subtle geological features; and displaying the seismic multivolume lineation map at the GUI, whereby the display of the minor lineations generated by the subtle geological features is enhanced, wherein the computer and GUI are configured to:

divide the formation into a series of adjacent grid cells;

grid the displayed lineations within the grid cells;

measure a total length of the displayed lineations within at least one selected grid cell;

measure a total combined lineation length in the fractured earth formation;

weight the measured total length of the displayed lineations within the at least one selected grid cell by the measured total lineation length in the fractured earth formation to generate a proxy for fracture intensity and/or intensity of reservoir alteration in the at least one grid cell; and measure an angular variance of the displayed lineations with a grid cell to generate a proxy for the connectivity of fracture networks in the at least one grid cell.

6. The system of claim 5, wherein the computer and GUI are furthermore configured to combine the proxies for fracture intensity and/or fracture connectivity with existing well data, which data include initial well production rates and/or ultimate well recoveries to allow sweet-spotting of production from areas of the fractured formation with a high fracture intensity/alteration and/or fracture connectivity.

* * * * *